United States Patent [19]
Hu et al.

[11] Patent Number: 5,990,894
[45] Date of Patent: Nov. 23, 1999

[54] METHOD FOR IMPLEMENTING THE POWER FUNCTION DP AND COMPUTER GRAPHICS SYSTEM EMPLOYING THE SAME

[75] Inventors: Vernon J. H. Hu, Union City; Donald A. Peterson, Elk Grove, both of Calif.

[73] Assignee: Sun Microsystems, Inc., Palo Alto, Calif.

[21] Appl. No.: 08/876,928

[22] Filed: Jun. 16, 1997

[51] Int. Cl.$^6$ .................................................. G06T 17/00
[52] U.S. Cl. ............................................................ 345/418
[58] Field of Search .................................... 345/418, 419, 345/420, 423, 424, 425

[56] References Cited

U.S. PATENT DOCUMENTS

| | | | |
|---|---|---|---|
| 5,793,371 | 8/1998 | Deering | 345/418 |
| 5,847,715 | 12/1998 | Fujita et al. | 345/418 |
| 5,850,489 | 12/1998 | Rich | 345/418 |
| 5,850,535 | 12/1998 | Maystrovsky et al. | 345/420 |

OTHER PUBLICATIONS

Foley, et al, "Computer Graphics: Principles and Practice," Chapter 16: Illumination and Shading, published by Addison–Wesley Publishing Company, Inc., pp. 721–814 (excluding color plates).

*Primary Examiner*—Phu K. Nguyen
*Assistant Examiner*—Cliff N. Vo
*Attorney, Agent, or Firm*—Conley, Rose & Tayon, PC; B. Noel Kivlin

[57] ABSTRACT

A graphics accelerator using an improved method for evaluating a power function. As part of determining realistic shading for objects in a three-dimensional scene, the Phong technique requires repeated evaluation of the power function $D^P$, where D is a base value and P is a power value with a fractional component. In one embodiment, a hardware implementation of this function determines the logarithm $\log_2(D^P)$ using a table lookup and a multiplication. An anti-logarithm function is then performed as follows. The logarithm $\log_2(D^P)$ is split into three parts: an integer portion I, a five bit fractional portion F, and a remainder fractional portion R. The desired value $D^P$ is then expressible as $2^I 2^F 2^R$. The factor $2^F$ ln2 is found using a 32-entry lookup table. The factor $2^R$/ln2 is closely approximated by adding 1/ln2 to R. Multiplying these two factors and shifting by I bits advantageously produces the desired value $D^P$.

15 Claims, 2 Drawing Sheets

METHOD FOR IMPLEMENTING THE POWER FUNCTION DP AND COMPUTER GRAPHICS SYSTEM EMPLOYING THE SAME

BACKGROUND OF THE INVENTION

1. Field of the Invention

This invention relates to the field of computer generated graphics, and in particular to a graphics accelerator chipset with a capability for producing realistic lighting effects.

2. Description of Related Art

Realistic displays of objects are obtained by generating perspective projections with hidden surfaces removed and then applying shading and color patterns to the visible surfaces. The intensity of light that should be seen when a surface is viewed is determined by a shading model. The intensity calculations are based on the optical properties of surfaces, the relative positions of the surfaces, and their orientation with respect to light sources.

Light sources that illuminate an object are of two basic types, light-emitting sources and light-reflecting sources. Light-emitting sources include light bulbs and the sun. Light-reflecting sources are illuminated surfaces of other objects, such as the walls of a room, that are near the object being viewed. A surface that is not directly exposed to a light-emitting source will still be visible if nearby objects are illuminated. The multiple reflections of light from such nearby sources combine to produce a uniform illumination called ambient light.

A shading model for calculating the intensity of light reflected from a surface can be established by considering contributions from the ambient light sources and point sources in the vicinity of the surface. Both of these sources produce light reflections that are scattered in all directions. This scattered light is called diffuse reflection, and it results from the surface roughness. A matte surface produces primarily diffuse reflections, so that the surface appears equally bright from all viewing directions. In addition to diffuse reflection, point sources create highlights, or bright spots, called specular reflection. This highlighting effect is more pronounced on shiny surfaces than on dull surfaces.

Since ambient light is the result of multiple reflections from nearby objects, it can be considered to be of uniform intensity $I_s$ in all directions. When ambient light is reflected from a surface, it produces a uniform illumination of the surface at any viewing position from which the surface is visible. If a surface is exposed to only ambient light, the intensity of the diffuse reflection at any point on the surface may be expressed as $$I = k_d I_a \qquad (1)$$

where $k_d$ is the reflectivity of the surface. It is assigned a constant value in the interval 0 to 1, according to the reflective properties of the surface. Highly reflective surfaces have a reflectivity near 1.

Rarely are surfaces illuminated with ambient light alone. A shading model that calculates intensities according to the above equation would shade all visible surfaces of an object with the same intensity. More realistic shading is obtained by including the effects of point sources in the shading model.

The calculation of diffuse reflection due to a point source of light is based on Lambert's cosine law, which states that the intensity of the reflected light depends on the angle of illumination. A surface that is perpendicular to the direction of the incident light appears brighter than a surface that is at an angle to the direction of the incoming light. As the angle increased, less of the incident light is reflected by the surface. The orientation of a surface can be described with a unit normal vector N and the direction of the light source can be described with a unit vector L. The angle $\theta$ between these two vectors is called the angle of incidence, and Lambert's cosine law states that the intensity of reflected light is proportional to cos $\theta$. The cos $\theta$ can be calculated from the dot product of these two unit vectors:

$$\cos \theta = N \cdot L. \qquad (2)$$

When a surface is illuminated by a point source the angle of incidence is between 0° and 90°. When cos $\theta$ is negative, the light source is "behind" the surface.

The brightness of an illuminated surface is also dependent on the distance to the light source, since more distant sources are fainter than those that are nearer. If d represents the distance from a light source to a point on the surface, and $I_P$ is the intensity of the source, the intensity of the diffuse reflection at that position on the surface can be modeled as $$I = k_d I_P (N \cdot L)/(d + d_0) \qquad (3)$$

where parameter $d_0$ is a constant that is included to prevent the denominator from approaching zero when d is small. This adaptation of Lambert's cosine law has been found to produce realistic shading of surfaces. Theoretically, the light intensity arriving at a surface is proportional to $1/d^2$, where d is the distance from the surface to the point source. However, most light sources are larger than points, and the intensity may be expected to decrease less rapidly. The denominator in the above equation more accurately models the intensity reflections for surfaces at varying distances from a nearby light source.

Total diffuse reflection for a surface illuminated by ambient light and one point source is given by $$I = k_d I_a + k_d I_P (N \cdot L)/(d + d_0). \qquad (4)$$

If more than one point source is to be included in a scene, the above equation is expanded to include terms for the additional light sources.

At certain viewing angles, a shiny surface reflects all incident light, independent of the reflectivity values. This phenomenon, called specular reflection, produces a spot of reflected light that is the same color as the incident light. Normally, objects are illuminated with white light, so that the specular reflection is a bright white spot. For an ideal reflector (perfect mirror), the angle of incidence and the angle of specular reflection are the same. The unit vector R is used to represent the direction for specular reflection. Unit vector V points in the direction of the viewer, and unit vector L points to the light source. Specular reflection with a perfect reflector can only be seen when V and R coincide (i.e. the angle $\phi$ between V and R is zero).

Real objects exhibit specular reflection over a range of positions about the vector R. Shiny surfaces have a narrow reflection range, and dull surfaces have a wider reflection range. Specular-reflection models must produce the highest intensity in the direction of R, with the intensity decreasing rapidly as the viewing angle $\phi$ increases.

One method for modeling specular reflection, developed by Phong Bui Tuong and called the Phong model, sets the intensity of specular reflection proportional to $\cos^n \phi$. The value assigned to n determines the type of surface that is to be viewed. A very shiny surface is modeled with a large value for n (200 or more), and smaller values (down to 1) are used for duller surfaces. For a perfect reflector, n is infinite. A rough surface such as cardboard might be assigned a value near 1.

Specular reflection also depends on the angle of incidence. In general, the intensity increases as the angle of incidence increases. This effect is incorporated into the specular reflection model by making the intensity proportional to a reflection function $W(\theta)$, so that the complete reflection model is written as $$I = k_d I_a + [k_d(N \cdot L) + W(\theta)\cos^n \phi] I_P/(d+d_0). \quad (5)$$

The functional form for $W(\theta)$ depends on the surface material. Some materials, such as glass, exhibit very little specular reflection at smaller angles of incidence but increase the intensity of the specular reflection as $\theta$ approaches 90°. Some materials have nearly constant specular reflection for all incidence angles, so that W could be assigned a constant value in the interval 0 to 1.

Since V and R are unit vectors in the vieiwng and reflection directions, the cos $\phi = V \cdot R$ Also, for many applications, the intensity calculations can be simplified by setting $W(\theta)$ to a constant value $k_s$ for the surface. The complete intensity model for reflection, due to ambient light and a single point source can then be written as $$I = k_d I_a + [k_d(N \cdot L) + k_s(V \cdot R)^n] I_P/(d+d_0). \quad (6)$$

In this model, constant values are assigned to parameters $k_d$, $k_s$, and $d_0$ for each illuminated surface. Intensity values for the ambient light and the point sources are set, and values for the unit vectors are established. For each point on an illuminated surface, the relevant dot products are calculated and the intensity of the reflected light determined.

Since an infinite number of intensity points could be generated over the various surfaces in a scene, an effective method for determining the specular intensities at visible surface positions is to trace rays backward from the viewing position to the light source. This technique is referred to as ray tracing.

Starting from the viewing position, the ray passing through each pixel in the view plane is traced back to a surface in the three-dimensional scene. The ray is then reflected backward from this surface to determine whether it came from another surface of from a point source. This backward tracing continues until the ray ends at a light source or passes out of the scene. Each pixel is processed in this way, and the number of rays that must be traced is equal to the number of pixels to be displayed.

After a ray has been processed to determine all specular intensity contributions, the intensity of the corresponding pixel is set. Ray tracing requires considerable computation, but it produces highly realistic results. To enable more extensive use of realistic shading and ray tracing techniques in computer generated graphics, techniques for reducing the computation time for these models are desirable.

SUMMARY OF THE INVENTION

The problems outlined above are in large part solved by a graphics accelerator using an improved method for evaluating a power function. As part of determining realistic shading for objects in a three-dimensional scene, the Phong technique requires repeated evaluation of the power function $D^P$, where D is a base value and P is a power value with a fractional component. In one embodiment, a hardware implementation of this function determines the logarithm $\log_2(D^P)$ using a table lookup and a multiplication. An anti-logarithm function is then performed, as follows. The logarithm $\log_2(D^P)$ is split into three parts: an integer portion I, a five bit fractional portion F, and a remainder fractional portion R. The desired value $D^P$ is then expressible as $2^I 2^F 2^R$. The factor $2^F \ln 2$ is found using a 32-entry lookup table. The factor $2^R/\ln 2$ is closely approximated by adding $1/\ln 2$ to R. Multiplying these two factors and shifting by I bits advantageously produces the desired value $D^P$.

Broadly speaking, the present invention contemplates a power function device for computing a value $D^P$, having a logarithm $\log_2(D^P)$ which is expressible as the combination of an integer portion I, a fixed-precision fractional portion F, and a remainder portion R. The power function device comprises an adder, a lookup table, a multiplier, and a shift unit. The adder is coupled to receive the remainder portion R, and configured to add a predetermined constant to the remainder portion R to produce a first factor. The lookup table is coupled to receive the fixed-precision fractional portion F and configured to responsively provide a second factor. The multiplier is coupled to receive the first and second factors, and configured to produce a product of the first and second factors. Also, the shift unit is coupled to receive the product and the integer portion I, and configured to shift the product according to the integer portion I to produce the value $D^P$.

The present invention further contemplates a computer graphics generation system comprising an interface module, a computation module, a draw module, and a RAMDAC (Random Access Memory Digital to Analog Converter). The interface module is coupled to a bus for receiving image information. The computation module is coupled to receive image information from the interface module, and configured to determine realistic lighting effects based on the image information. The realistic lighting effects are produced with a power function $D^P$, where D is a base value and P is a power value, and where a logarithm $\log_2(D^P)$ is expressible as the combination of an integer portion I, a fixed precision fractional portion F, and a remainder portion R The computation module comprises an adder, a lookup table, a multiplier, and a shift unit. The adder is coupled to receive the remainder portion R, and configured to add a predetermined constant to the remainder portion R to produce a first factor. The lookup table is coupled to receive the fixed-precision fractional portion F and configured to responsively provide a second factor. The multiplier is coupled to receive the first and second factors, and configured to produce their product. The shift unit is coupled to receive the product and the integer portion I, and configured to shift the product according to the integer portion I to produce a result of the power function $D^P$. The draw module is coupled to receive the image information with the realistic lighting effects from the computation module, and configured to responsively produce pixel data. The RAMDAC is coupled to receive the pixel data and configured to convert the pixel data into an analog video signal.

The present invention still further contemplates a method for determining a power function value $D^P$ from a base value D and a power value P. The method comprises receiving the base value D; determining a logarithm $\log_2 D$; receiving the power value P; and multiplying the logarithm $\log_2 D$ with the power value P to produce a logarithm $\log_2(D^P)$. The logarithm $\log_2(D^P)$ has an integer value I, a fixed-precision fractional value F, and a remainder value R. The method further comprises adding $1/\ln 2$ to the remainder value R to produce a first factor substantially equal to $2^R/\ln 2$; applying the fixed-precision fractional value F to a lookup table to produce a second factor substantially equal to $2^F \ln 2$; multiplying the first factor with the second factor to produce a product substantially equal to $2^{F+R}$; and shifting the product by a number of positions indicated by the integer value I to produce the power function value $D^P$.

BRIEF DESCRIPTION OF THE DRAWINGS

Other objects and advantages of the invention will become apparent upon reading the following detailed description and upon reference to the accompanying drawings in which.

Figure 1:
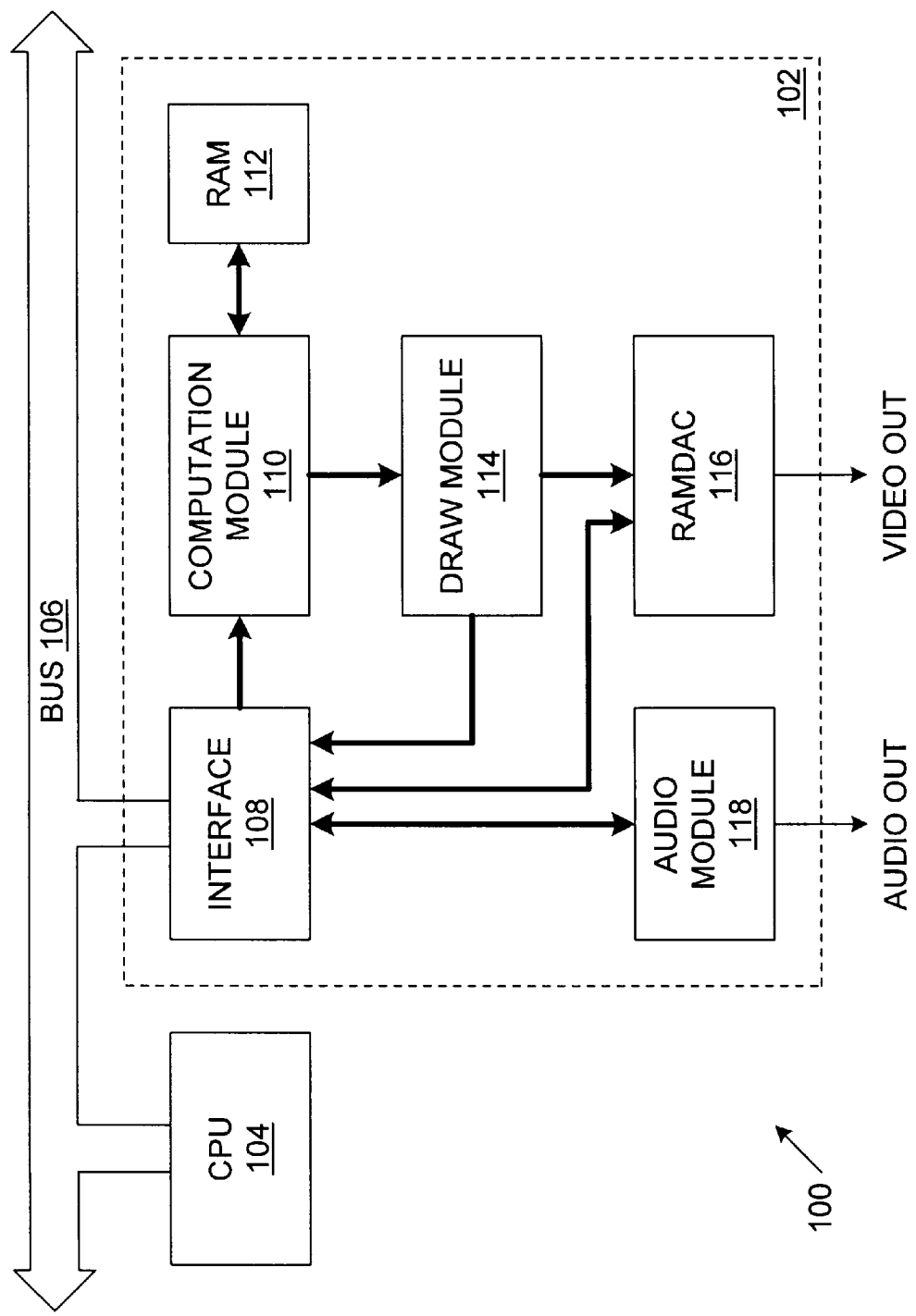
FIG. 1 is a computer system with a graphics accelerator with an improved implementation of a power function.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Pages 276–295 of *Computer Graphics* by Donald Hearn and M. Pauline Baker, published in 1986 by Prentice-Hall, Inc., of Englewood Cliffs, N.J., 07632, are hereby incorporated by reference as though completely set forth herein.

Turning now to FIG. 1, a computer system 100 is shown having a graphics accelerator 102 coupled to a CPU (central processing unit) 104 via a bus 106. Graphics accelerator 102 communicates with the bus 106 using the interface module 108. Graphics accelerator 102 further comprises a computation module 110, RAM (random access memory) 112, draw module 114, RAMDAC (random access memory digital to analog converter) 116, and audio module 118. Interface module 108 extracts image and/or audio information from the bus 106, and distributes the information. Audio information is sent to audio module 118 for conversion into an audio signal. Stored bit-mapped image data is sent to RAMDAC 116. Other image data, such as vector, object, and scene information, is sent to computation module 110. Computation module 110 transforms the image information into polygons with attributes, which are then rendered into pixel information by draw module 114. The pixel information may then be sent to RAMDAC 116 for conversion into a video signal, or to interface module 108 for transmission on bus 106. Interface module 108 can also convey service requests from audio module 118, RAMDAC 116, and draw module 114 to CPU 104. Microcode for running computation module 110 is stored in RAM 112. RAM 112 may also be used to store image information during the transformation process by computation module 110.

Generally speaking, computation module 110 advantageously reduces memory and hardware requirements for performing realistic lighting determination using a power function without sacrificing picture quality. The power function used in graphics rendering is typically performed using table lookups. This approach requires very large lookup tables to avoid picture degradation due to the "step-like" nature of the power function when implemented in this fashion. An alternate approach would be to use an iteration method such as Newton-Raphson where successive approximations are determined. However this requires excessive computational time for graphics rendering.

Computation module 110 receives image information which specifies the position and orientation of an object relative to a viewpoint and a light source, and operates to determine realistic lighting effects based on this information. The object is comprised of surfaces each having a unit normal vector N which is perpendicular to the surface, a unit light vector L which points in the direction of the light source, a unit reflection vector which is determined from N and L, and a unit viewing vector which points in the direction of the viewpoint. The specular component of the reflection of light from the surface is determined using the following term from equation (6):

$$k_s(V \cdot R)^n,$$

where V·R is in the interval 0 to 1, and n is a value with a wide range. It is noted that in the determination of realistic lighting effects, the power function $D^P$ must be evaluated a great number of times in each image, and hence it is desirable to maximize the efficiency of the power function implementation. As will be discussed further below, computation module 110 implements an improved method for evaluating the power function.

RAM 112 provides storage for the microcode which governs the operation of computation module 110 which operates to determine realistic lighting effects of a scene. Once the shading for the scene has been determined, the image information is forwarded to draw module 114. Draw module 114 operates to convert the image information with realistic lighting and shading to pixel data, i.e. the image as represented by individual pixels. The RAMDAC 116 stores the pixel data and converts the pixel data from digital form to an analog video signal suitable for display on a video monitor. It is noted that any of various rasterizers or analog-to-digital converters may be used to convert the pixel data to an analog video signal. The RAMDAC may further include a 3D-RAM module which operates to intelligently omit any hidden image information (i.e. background objects obscured from view by foreground objects).

Figure 2:
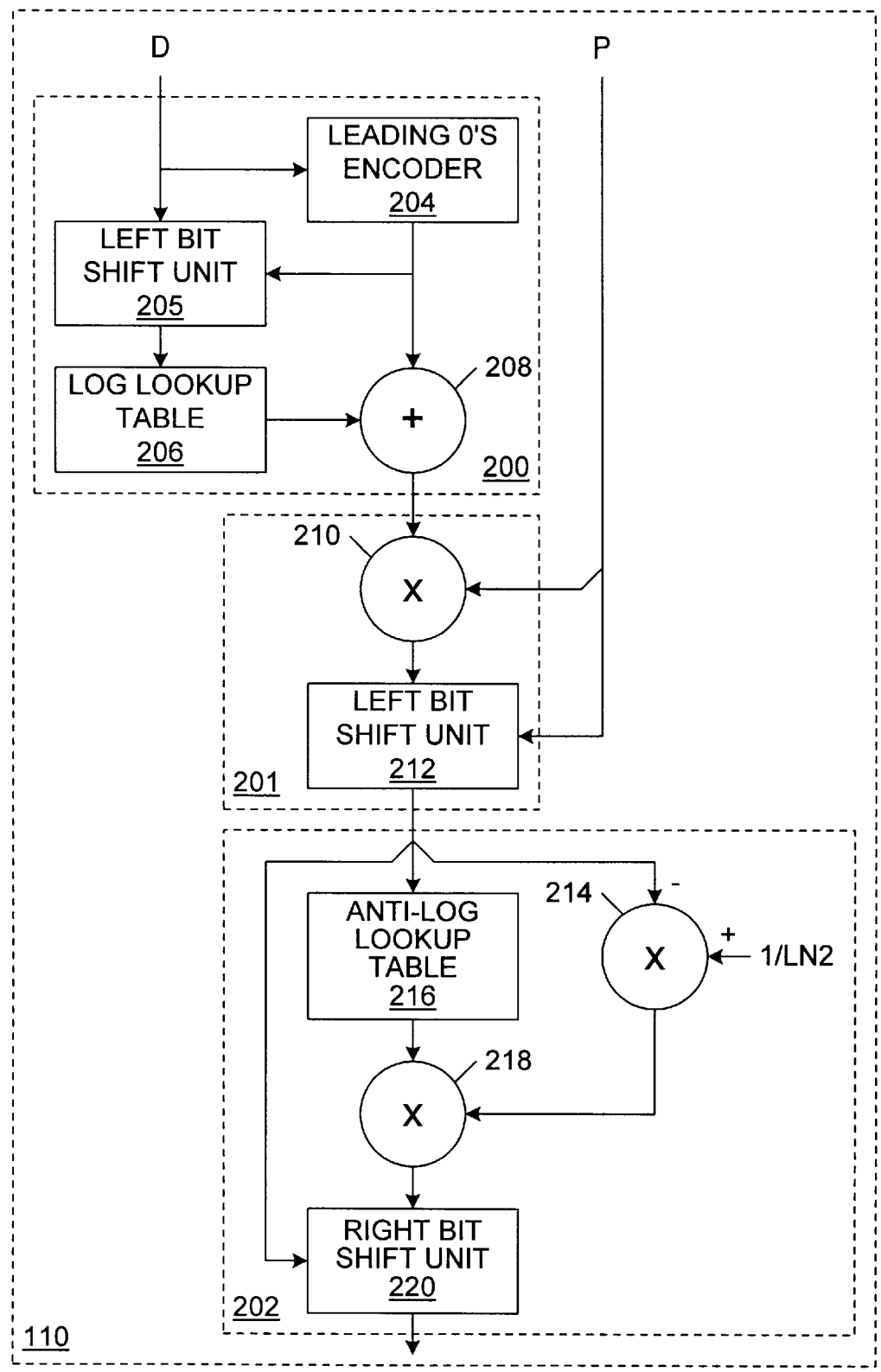
FIG. 2 illustrates an improved implementation of a power function used in a computation module for determining realistic lighting effects.

Turning to FIG. 2, computation module 110 is shown having an improved implementation of the power function $D^P$. It is noted that $D^P$ may be calculated in the following manner:

(1) find $\log_2 D$
(2) multiply $\log_2 D$ by P to get $\log_2(D^P)$
(3) find antilog of $\log_2(D^P)$.

Computation module 110 includes a logarithm unit 200, a multiplier unit 201, and an antilog unit 202, which are coupled to perform the above method for calculating the power function. In other words, the logarithm unit 200 determines the logarithm of D, the multiply unit 201 multiplies the logarithm of D by P to produce the logarithm of $D^P$, and the antilog unit 202 operates to convert the logarithm of $D^P$ into the desired value $D^P$.

Multiple methods may be used to implement logarithm unit 200. In one embodiment in which D is restricted to the interval between 0 and 1, logarithm unit 200 includes leading zeros encoder 204, left bit shift unit 205, a log lookup table 206, and an adder 208. Leading zeros encoder 204 is coupled to receive the base value D, and configured to determine the number of leading zeros in the binary representation of D. This provides the (negative) integer portion of the logarithm $\log_2 D$. In another embodiment, the number of leading zeros is restricted to the zeros to the right of the decimal point (i.e. does not include a zero in the units place), so that the number of leading zeros is offset from the integer portion of the logarithm of D by one. The number of leading zeros is sent from the leading zeros encoder 204 to left bit shift unit 205.

Left bit shift unit 205 is configured to receive the base value D and to shift the base value D by the number of leading zeros to remove the leading zeros and thereby produce a normalized value. The normalized value in this embodiment has a binary representation which always begins with a one, either to the left or the right of the decimal point, depending on the embodiment. In the first case, the logarithm of the normalized value will be a non-negative fraction less than 1, while in the second case, the logarithm of the normalized value will be a non-positive fraction greater than −1. The logarithm of the normalized value is determined from the log lookup table 206. Since the normalized value is known to begin with a 1, the 1 is not necessary to determine the logarithm. The log lookup table 206 can thus be generated assuming the presence of the 1, and the size of the log lookup table advantageously reduced.

The fractional portion of the logarithm $\log_2 D$ provided by log lookup table 206 is an addend which is added to the number of leading zeros (the integer portion of the logarithm $\log_2 D$) by adder 208. The adder 208 provides the logarithm $\log_2 D$ as the output of the logarithm module 200.

Multiplier unit 201 is coupled to receive the logarithm $\log_2 D$ from the logarithm module 200, and further coupled to receive the power value P. The multiplier unit 201 is configured to multiply the logarithm $\log_2 D$ with the power value P to produce the logarithm $\log_2(D^P)$. In one embodiment, P is provided in the format of a fraction and an exponent, e.g. $0.10110 e 100_2$, to represent $(22/32) \times 2^4$, or 11 in base 10. For this embodiment, multiplier unit 201 includes a multiplier 210 configured to multiply the fractional portion of power value P with the logarithm $\log_2 D$ from logarithm unit 200 to form an intermediate product. Multiplier unit 201 further includes a left bit shift unit 212 coupled to receive the intermediate product from the multiplier 210 and configured to shift the intermediate product by the exponent portion of the power value P to complete the multiplication operation and produce the logarithm $\log_2(D^P)$.

Anti-log unit 202 is coupled to receive the logarithm $\log_2(D^P)$ from the multiplication unit 201, and configured to convert the logarithm into the desired value $D^P$. It is noted that the binary representation of the logarithm $\log_2(D^P)$ can be split into an integer portion I, a fixed-precision fractional portion F, and a remainder portion R. For example, if the $\log_2(D^P) = -2.7109375 = -10.1011011000_2$, it may be split into an integer portion $I = -10_2$, a five-bit fractional portion $F = -0.10110_2$, and a remainder portion $R = -0.0000011000_2$. The desired value $D^P$ is the anti-log of the sum of these portions, i.e. $DP = 2^{I+F+R}$, which can be expressed as the product of three factors, i.e. $2^R 2^F 2^I$.

The first factor, $2R$, can be approximated using the following series expansion:

$$e^x = 1 + x + x^2/2! + \ldots + x^n/n!$$

in the following manner:

$$2^R = e^{R \ln 2} = 1 + R \ln 2 + (R \ln 2)^2/2! + \ldots$$

Since R in this embodiment is less than $1/32$ ($=0.00001_2$), the approximation error made by truncating the series after the second term is less than $2^{-12}$. Consequently the first factor $2^R$ may be expressed as $(1 + R \ln 2)$. To further simplify the implementation, the first factor is scaled to become $2^R/\ln 2 = (1/\ln 2 + R)$.

The (scaled) second factor $2^F \ln 2$ has 32 possible values which correspond to the 32 possible values of the five-bit fractional portion F. These 32 values can be stored in a lookup table. The (scaled) second factor provided by the lookup table is multiplied by the (scaled) first factor to produce product $2^{R+F}$. The final factor $2^I$ can be implemented by shifting the product 2R+F by I bits.

Anti-log unit 202 includes an adder 214, an anti-log lookup table 216, a multiplier 218, and a right bit shift unit 220. The adder 214 is coupled to receive the remainder portion R and configured to add to it a predetermined constant to produce a first factor. For example, in one embodiment the first factor $2^R/\ln 2$ is found from adding $1/\ln 2$ to R. The anti-log lookup table is coupled to receive the fixed-precision fractional portion F and configured to responsively provide a second factor. For example, in one embodiment, a five bit fractional portion F is converted into one of 32 possible values of the function $2^F \ln 2$. The multiplier is coupled to receive the first and second factors, and configured to produce their product. The right bit shift unit is coupled to receive the product and configured to shift the product according to the integer portion I to produce the desired value $D^P$. The desired value $D^P$ is provided as the output of the anti-log unit 202.

It is noted that the lookup table 216 may be implemented as a memory module (such as a ROM) or it may be implemented by discrete logic. The chosen precision of the fractional portion F will influence this design choice.

It is further noted that the various functional units in FIG. 2 may be implemented in hardware, or in software, or in some combination of hardware and software. The method of
  (i) receiving the base value D;
  (ii) determining a logarithm $\log_2 D$;
  (iii) receiving the power value P;
  (iv) multiplying the logarithm $\log_2 D$ with the power value P to produce a logarithm $\log_2(D^P)$ having an integer value I, a fixed-precision fractional value F, and a remainder value R;
  (v) adding $1/\ln 2$ to the remainder value R to produce a first factor substantially equal to $2^R/\ln 2$;
  (vi) applying the fixed-precision fractional value F to a lookup table to produce a second factor substantially equal to $2^F \ln 2$;
  (vii) multiplying the first factor with the second factor to produce a product substantially equal to $2^{F+R}$; and
  (viii) shifting the product by a number of positions indicated by the integer value I to produce the power function value $D^P$ advantageously minimizes the implementation complexity of the power function without introducing undesirable "step-like" effects which would lead to image degradation.

Numerous variations and modifications will become apparent to those skilled in the art once the above disclosure is filly appreciated. It is intended that the following claims be interpreted to embrace all such variations and modifications.

What is claimed is:

1. A power function device for computing a value $D^P$, wherein a logarithm base two of the value, $\log_2(D^P)$, is expressible as the combination of an integer portion I, a fixed precision fractional portion F, and a remainder portion R, and wherein the power function device comprises:
  an adder coupled to receive the remainder portion R, wherein the adder is configured to add a predetermined constant to the remainder portion R to produce a first factor;

a lookup table coupled to receive the fixed-precision fractional portion F and configured to responsively provide a second factor;

a multiplier coupled to receive the first factor, wherein the multiplier is further coupled to receive the second factor, and wherein the multiplier is configured to produce a product of the first and second factors; and a shift unit coupled to receive the product, wherein the shift unit is further coupled to receive the integer portion I, and wherein the shift unit is configured to shift the product according to the integer portion I to produce the value $D^P$.

2. The power function device of claim 1, wherein the predetermined constant is substantially equal to 1/ln2.

3. The power function device of claim 1, wherein the lookup table is a ROM for determining a function $2^{F \cdot ln2}$ of the fixed-precision fractional portion F.

4. The power function device of claim 1, wherein the fixed precision fractional portion F has a precision of five bits.

5. The power function device of claim 1, further comprising:

a logarithm module configured to receive a value D and to responsively produce a logarithm $log_2 D$; and a multiplier unit coupled to receive the logarithm $log_2 D$ from the logarithm module, wherein the multiplier unit is configured to receive a value P, and wherein the multiplier unit is configured to responsively produce the logarithm $log_2(D^P)$.

6. The power function device of claim 5, wherein the logarithm module comprises:

a leading-zeros encoder configured to receive the value D and to responsively produce a number of leading zeros in the value D;

a second shift unit configured to receive the value D, wherein the second shift unit is coupled to receive the number of leading zeros from the leading-zeros encoder, and wherein the second shift unit is configured to responsively shift the value D, thereby removing leading zeros and producing a normalized value;

a second lookup table coupled to receive the normalized value from the second shift unit and configured to responsively provide an addend; and an adder coupled to receive the addend from the second lookup table, coupled to receive the number of leading zeros from the leading zeros encoder, and configured to provide the logarithm $log_2 D$ by adding the addend to the number of leading zeros.

7. The power function device of claim 5, wherein the multiplier unit comprises: a second multiplier configured to multiply a fractional portion of the value P by the logarithm $log_2 D$ to produce an intermediate product; and a third shift unit coupled to receive the intermediate product from the second multiplier, wherein the third shift unit is configured to shift the intermediate product by an exponent portion of the value P to produce the logarithm $log_2(D^P)$.

8. A computer graphics generation system comprising:

an interface module coupled to a bus for receiving image information;

a computation module coupled to receive said image information from the interface module, wherein the computation module is configured to determine realistic lighting effects based on said image information, wherein said realistic lighting effects are produced with a power function $D^P$, wherein D is a base value and P is a power value, wherein a logarithm $log_2(D^P)$ is expressible as the combination of an integer portion I, a fixed precision fractional portion F, and a remainder portion R, and wherein the computation module comprises:

an adder coupled to receive the remainder portion R, wherein the adder is configured to add a predetermined constant to the remainder portion R to produce a first factor;

a lookup table coupled to receive the fixed-precision fractional portion F and configured to responsively provide a second factor;

a multiplier coupled to receive the first factor, wherein the multiplier is further coupled to receive the second factor, and wherein the multiplier is configured to produce a product of the first and second factors; and a shift unit coupled to receive the product, wherein the shift unit is further coupled to receive the integer portion I, and wherein the shift unit is configured to shift the product according to the integer portion I to produce a result of the power function $D^P$;

a draw module coupled to receive the image information with the realistic lighting effects from the computation module, wherein the draw module is configured to responsively produce pixel data; and an analog-to-digital converter coupled to receive the pixel data and configured to convert the pixel data into an analog video signal.

9. The computer graphics generation system of claim 8, wherein the predetermined constant is substantially equal to 1/ln2.

10. The computer graphics generation system of claim 8, wherein the lookup table is a ROM for determining a function $2^F \cdot ln2$ of the fixed-precision fractional portion F.

11. The computer graphics generation system claim 8, further comprising:

a logarithm module configured to receive a value D and to responsively produce a logarithm $log_2 D$; and a multiplier unit coupled to receive the logarithm $log_2 D$ from the logarithm module, wherein the multiplier unit is configured to receive a value P, and wherein the multiplier unit is configured to responsively produce the logarithm $log_2(D^P)$.

12. The computer graphics generation system of claim 11, wherein the logarithm module comprises:

a leading-zeros encoder configured to receive the value D and to responsively produce a number of leading zeros in the value D;

a second shift unit configured to receive the value D, wherein the second shift unit is coupled to receive the number of leading zeros from the leading-zeros encoder, and wherein the second shift unit is configured to responsively shift the value D, thereby removing leading zeros and producing a normalized value;

a second lookup table coupled to receive the normalized value from the second shift unit and configured to responsively provide an addend; and an adder coupled to receive the addend from the second lookup table, coupled to receive the number of leading zeros from the leading zeros encoder, and configured to provide the logarithm $log_2 D$ by adding the addend to the number of leading zeros.

13. A method for determining a power function value $D^P$ from a base value D and a power value P, wherein the method comprises:

receiving the base value D;

determining a logarithm $\log_2 D$ using a logarithm lookup table;

receiving the power value P;

multiplying the logarithm $\log_2 D$ determined from the logarithm lookup table with the power value P to produce a logarithm $\log_2(D^P)$ having an integer value I, a fixed-precision fractional value F, and a remainder value R;

adding $1/\ln 2$ to the remainder value R to produce a first factor substantially equal to $2^R/\ln 2$;

applying the fixed-precision fractional value F to an anti-log lookup table to produce a second factor substantially equal to $2^F \ln 2$;

multiplying the first factor with the second factor to produce a product substantially equal to $2^{F+R}$; and shifting the product by a number of positions indicated by the integer value I to produce the power function value $D^P$.

14. The method of claim 13, wherein the fixed-precision fractional value F has a precision of 5 bits.

15. The method of claim 13, wherein the determining the logarithm $\log_2 D$ comprises:

converting the base value D into a number of leading zeros;

shifting the base value D by the number of leading zeros to produce a normalized base value;

applying the normalized base value to a lookup table to produce a logarithm of the normalized base value; and adding the number of leading zeros to the logarithm of the normalized base value to produce the logarithm $\log_2 D$.

* * * * *